UNITED STATES PATENT OFFICE.

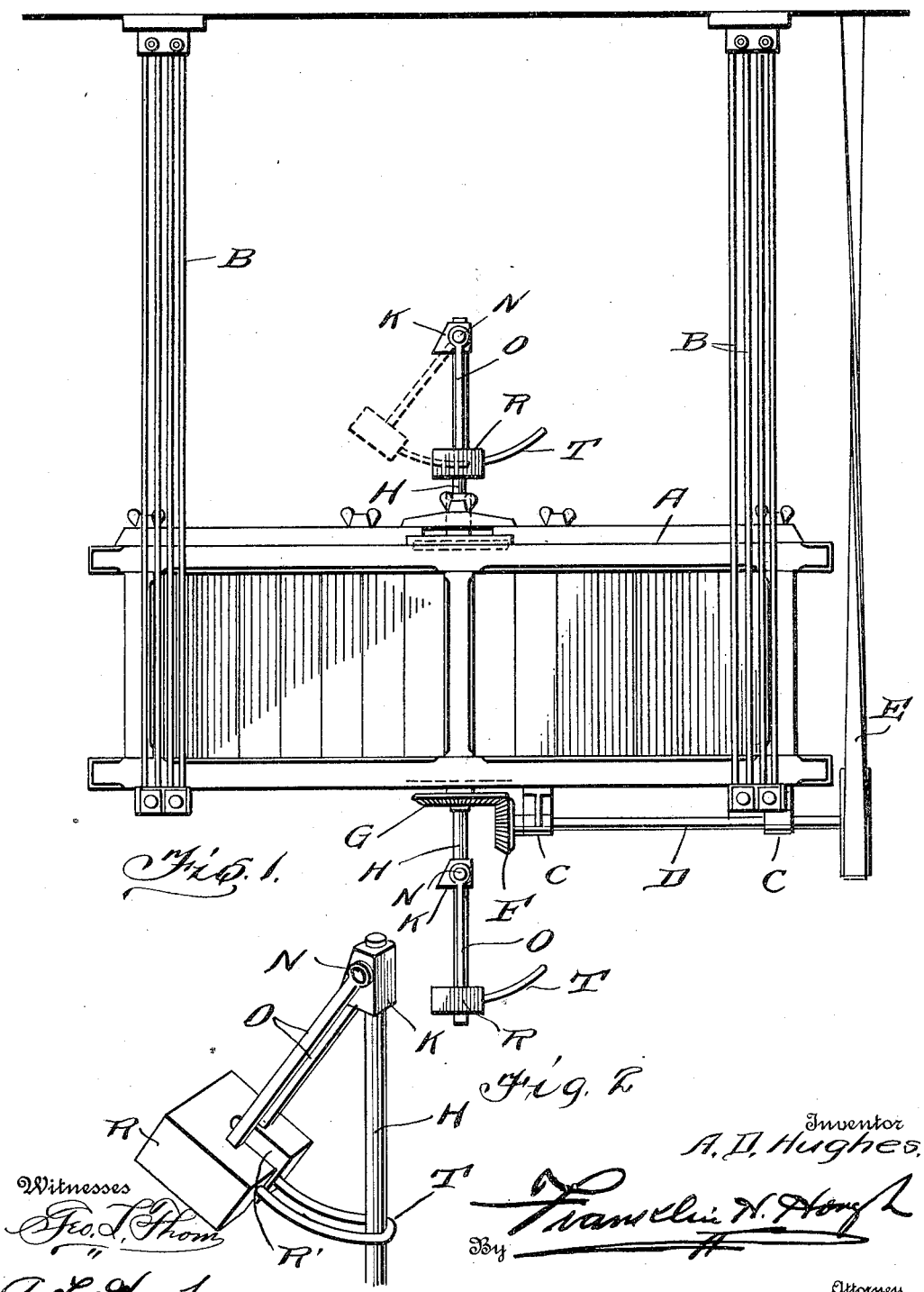

ARTHUR D. HUGHES, OF LAKETON, INDIANA.

GYRATING SCREEN.

999,563.     Specification of Letters Patent.     Patented Aug. 1, 1911.

Application filed December 30, 1910. Serial No. 600,041.

*To all whom it may concern:*

Be it known that I, ARTHUR D. HUGHES, a citizen of the United States, residing at Laketon, in the county of Wabash and State of Indiana, have invented certain new and useful Improvements in Gyrating Screens; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in flour sifters and especially in the provision of a means for supporting a gyratory motion to the sieve box and comprises essentially the provision of governor weights suspended from the shaft above and below the box and designed to close similar to the usual governor balls and adapted to be thrown out by centrifugal motion.

The invention comprises various details of construction, combinations and arrangements of parts which will be hereinafter fully described and then specifically defined in the appended claims.

I illustrate my invention in the accompanying drawings, in which:—

Figure 1 is a side elevation showing my device as applied to a flour sieve, and Fig. 2 is an enlarged detail perspective view of one of the centrifugally operated governor weights.

Reference now being had to the details of the drawings by letter, A designates a sieve box suspended by the rods B in the usual manner. Mounted in the bearings C secured to said sieve is a rotatable shaft D, driven by means of a pulley E from any source of power not shown. Fixed to the shaft D is a beveled pinion F which is in mesh with a similar pinion G which is fixed to the shaft H which is mounted in suitable bearings in the sieve frame. Said shaft has the two boxings K mounted thereon and held in fixed positions one above and one below the sieve box. Pivotal pins N project from each boxing and upon which the apertured ends of the bars O are journaled, said bars being fastened each to a weighted member R. Each of said weighted members is slotted as at R' and has a rod T fastened at its ends, one upon either side of the slot and straddling the same and forming a loop which surrounds the shaft H.

The operation of the apparatus will be readily understood and is as follows:—As a rotary movement is imparted to the shaft H, the weighted members R will be thrown out by centrifugal force to the positions shown in dotted lines in Fig. 1 of the drawings and thus produce the required gyratory motion, the speed at which the shaft rotates governing such gyratory movement imparted to the sieve.

What I claim to be new is:—

A gyratory flour sieve comprising a sieve box, means for supporting the latter, a vertically disposed shaft mounted in said box, a boxing fixed to said shaft, pivotal pins projecting from said boxing, bars pivotally mounted one upon each of said pins, a centrifugally operated weight member recessed upon its inner edge, the outer ends of said bars fastened to the end of said weight, one upon either side of said recess, a loop surrounding said shaft and having an end fastened to the recessed edge upon either side of the recess therein, the inner edges of the loop and the faces of the recess being flush.

In testimony whereof I hereunto affix my signature in the presence of two witnesses.

ARTHUR D. HUGHES.

Witnesses:
W. H. TRUITT,
MARION IRELAND.

Copies of this patent may be obtained for five cents each, by addressing the "Commissioner of Patents, Washington, D. C."